United States Patent [19]

White

[11] Patent Number: 4,874,071
[45] Date of Patent: Oct. 17, 1989

[54] VISCOUS CLUTCH FOR ENGINE COOLING FAN

[75] Inventor: Charles R. White, Troy, Mich.

[73] Assignee: General Motors Corporation, Detroit, Mich.

[21] Appl. No.: 231,311

[22] Filed: Aug. 12, 1988

[51] Int. Cl.[4] ................... F16D 35/00; F16D 43/25
[52] U.S. Cl. ............................... 192/58 B; 192/82 T
[58] Field of Search ............... 192/58 B, 58 R, 82 T

[56] References Cited

U.S. PATENT DOCUMENTS

| | | | |
|---|---|---|---|
| 2,948,268 | 8/1960 | Roper et al. | 192/58 B |
| 3,268,041 | 8/1966 | Roper | 192/58 B |
| 3,381,781 | 5/1968 | Summerville | 192/58 R |
| 3,858,697 | 1/1975 | Brewer et al. | 192/58 B |
| 4,271,946 | 6/1981 | Bridge | 192/58 B |
| 4,630,721 | 12/1986 | Johnston et al. | 192/58 B |
| 4,699,258 | 10/1987 | Johnston et al. | 192/58 B |
| 4,741,421 | 5/1988 | Johnston | 192/58 B |

Primary Examiner—Rodney H. Bonck
Assistant Examiner—Nicholas Whitelaw
Attorney, Agent, or Firm—Charles R. White

[57] ABSTRACT

This viscous fluid fan drive clutch has a chamber divider and flow control ring at the face of the clutch plate which prevents fluid bypass of the shear zone and features flow blocker arms depending from the ring which fit within fluid fill passages in the clutch plate to tailor the response time of the clutch.

4 Claims, 2 Drawing Sheets

VISCOUS CLUTCH FOR ENGINE COOLING FAN

BACKGROUND OF THE INVENTION

This invention relates to fan clutches and more particularly to a temperature responsive automatic viscous clutch for an engine cooling fan featuring new and improved feed of fluid to the clutch shear zone with optimized control of fluid flow rate and routing.

FIELD OF THE INVENTION

An automatic viscous fan clutch is a hydraulic device shearing silicone fluid for varying fan speed in response to engine temperature variation. This device provides a temperature responsive fluid drive into a high delivery fan to insure adequate cooling at reduced engine speeds. The drive is substantially disconnected at predetermined lower temperature to eliminate excessive fan noise and power loss at high speeds when there is no requirement for fan drive cooling. Generally when the engine is cool, the viscous silicone clutching fluid is stored in a reservoir of the fan clutch and is blocked from entry into the working chamber or fluid shear zone of the clutch. As the temperature of the engine rises, so does the temperature of a bimetallic coil which is connected to a control arm that turns a valve plate progressively exposing an opening in the pump plate. The silicone fluid flows through this opening from the reservoir into the working area in the clutch. Raised pumping devices located on the pump plate force the fluid back into the reservoir through small openings in front of each of the pumping devices. As the temperature continues to rise, the control arm uncovers more of the opening and allows more of the silicone fluid to enter the working chamber. The automatic fan clutch becomes fully engaged when the silicone fluid circulating between the working chamber and the reservoir reaches a sufficient level to completely fill the fluid shear zone or working chamber formed between the clutch body and the clutch plate. The resistance of the silicone fluid to the shearing action caused by the speed differential between the body and clutch plate transmits torque to the clutch body to thereby turn the fan blade assembly attached thereto. The reverse situation occurs when the temperature drops below a predetermined temperature. As this lower temperature is reached, the bimetallic controlled valve plate slowly closes the opening to block the fluid flow from the reservoir into the working chamber. The action of the pumping devices remove the silicone fluid from the shear zone so that shearing action is terminated or sharply reduced. Thus as less torque is transmitted to the clutch body the speed of the fan decreases to its minimum speed.

SUMMARY OF THE INVENTION

This invention relates to a viscous fan drive clutch such as described above and features new and improved control of the flow rate and routing of viscous clutch fluid to the shear zone for optimized and selected clutch performance.

The preferred embodiment of this invention employs radially extending slots in the face of the clutch plate that feed viscous clutch fluid into the shear zone of the clutch. These feed slots are preferably adjacent to and radially inward of a sealing ring operatively disposed between the face of the clutch plate and pump plate. This sealing ring diverts clutch fluid flow through the radial feed slots and then the flow enters into the shear zone so that all flow is subjected to shear by the interleaved lands to provide improved effectiveness and higher efficiency. Accordingly, with this invention, fluid does not bypass the shear zone, as in many applications, for immediate pumping back to the reservoir without being sheared.

In this invention the sealing ring is formed with integral blocker arms of selected lengths which fit into and partially block the feed slots so that feed slots size can be readily adjusted to meet predetermined requirements. If increased fluid fill time is required each slot or selected slots can be blocked so that the flow opening has a selected size reduction. The blocker arms are offset from the surface of the sealing ring so that fraction between the ring and pup plate is not increased.

In this invention an annular intermediate chamber is formed between the forward face of the clutch plate and the rearward face of the pump plate whose diameter is defined by the sealing ring operatively mounted between these two components. From this intermediate chamber cavity, the fluid is quickly pumped by the pumping devices embossed on the rotating pump plate through a discharge port therein to the reservoir. A primary advantage this invention is to control the rate of feed to the shear zone and thereby control fill time and provide the desired clutch response time. This invention allows the same basic clutch design to be used for varying requirements by changing blocker arm dimension.

These and other features, objects and advantages of this invention will become more apparent from the following detailed description and drawing in which:

Figure 1:
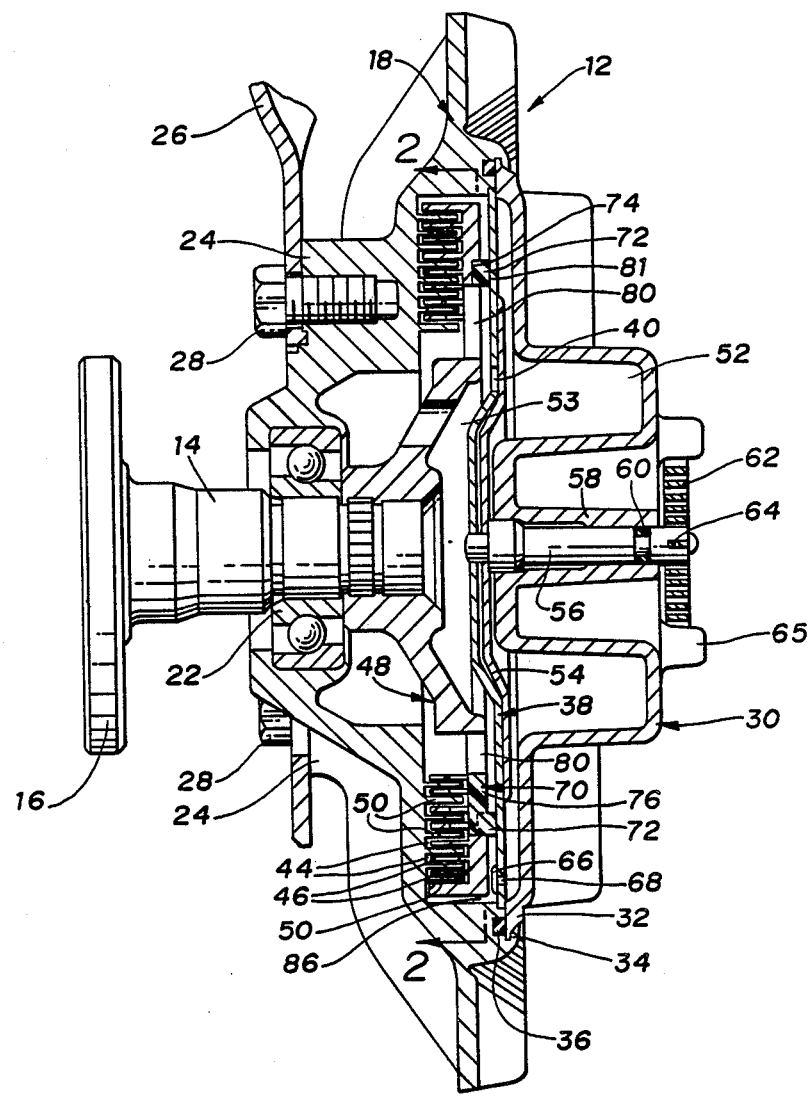
FIG. 1 is a cross-sectional view of a portion of a fluid shear-type clutch and fan assembly.

Turning now in greater detail to the drawing, there is shown in FIG. 1 a multi-bladed fan and clutch assembly 12 for drawing cooling air through the core of a vehicle radiator, not shown, through which engine cooling fluid is circulated. The fan and clutch assembly 12 is mounted on the outboard end of a rotatably driven shaft 14 whose inner end terminates in a flange 16 which can be secured to a conventional engine-driven water pump pulley, not shown. The fan and clutch assembly 12 comprises an annular dish-like main clutch body 18 centrally mounted for rotation on shaft 14 by bearing 22. The main body 18 is formed with a plurality of radially extending bosses 24 to which a multi-bladed fan 26 is attached by threaded fasteners 28. A cover plate 30 is mounted to the front of the main body 18 and cooperates therewith to form a housing for the viscous clutch and reservoir of this invention.

The cover plate 30 is a dished member having an annular outer edge 32 secured to the main body to annular retainer lip 34 spun over from the material of the main body. Annular seal 36 interposed between the edge 32 and the forward face of the main body prevents fluid leakage of the silicone viscous clutching fluid from the interior of the clutch.

Disposed immediately behind cover plate 30 is a disk-like annular pump plate 38 whose diameter is slightly less than that of the cover plate 30. This pump plate is drivingly secured to the main body 18 since it is trapped on an annular shoulder on the main body by the cover plate 30.

The pump plate has an opening or gateway 40 therein which, when opened, allows silicone clutching fluid to flow into an annular serpentined fluid shear zone 44 formed by the space between the interleaved concentric annular ridges or lands 46 of a clutch plate 48 and corresponding concentric annular ridges or lands 50 formed on the interior surface of the main body 18. The control of the flow rate and path of the clutching fluid from the reservoir to the shear zone is an important part of this invention and will further be explained below. The fluid sheared in shear zone 44 transmits input torque from the rotatably driven clutch plate 48, centrally splined to shaft 14, to provide for the hydraulic drive of main body 18 and the bladed fan 26 attached thereto for cooling fan operation. Because of slippage in the drive, fan speed is less than input speed when the input is driving the fan. A reservoir 52 formed between the cover plate 30 and the pump plate 38 contains a specified quantity of silicone clutching fluid that circulates in a toroidal path when the gate 40 is open to varying degrees of opening as described. The opening and closing of the gateway 40 to control the supply of the clutch silicone fluid into an intermediate chamber 53 and then into the shear zone is by action of a valve plate 54. The valve plate extends from driving connection with a center shaft 56 which is rotatably mounted in a tubular hub portion 58 formed in the center of the cover plate 30. An O-ring seal 60 is mounted in an annular groove in the shaft 56 and makes peripheral contact with the inner wall of the hub to prevent fluid leakage to the exterior of the unit. A helically wound bimetallic thermostatic valve control element 62 is provided with an inner end portion 64 which is mounted in a transverse slot formed in the forward end of the center shaft 56. The outer end of the valve control element 62 is secured to a post 65 projecting from the cover. With this arrangement, an increase or decrease in ambient temperature causes the winding or unwinding of the metallic element resulting in rotation of the center shaft 56 and the valve plate 54 attached thereto.

A cylindrical projecting pump element 66 pressed in the pump plate 38 adjacent to the periphery thereof pumps fluid through a discharge orifice 68 formed in the pump plate back into the reservoir as is well known in the art.

In the preferred embodiment of this invention there is a divider and flow control ring 70 of a suitable plastics material such as a filled Teflon operatively interposed between the pump plate and the clutch plate which separates intermediate fluid chamber 53 from a pumping chamber and routes substantially all fluid from the reservoir into the fluid sheer zone and further controls the rate of fluid flow into the shear zone as will be explained below.

Figures 3, 4, 5:
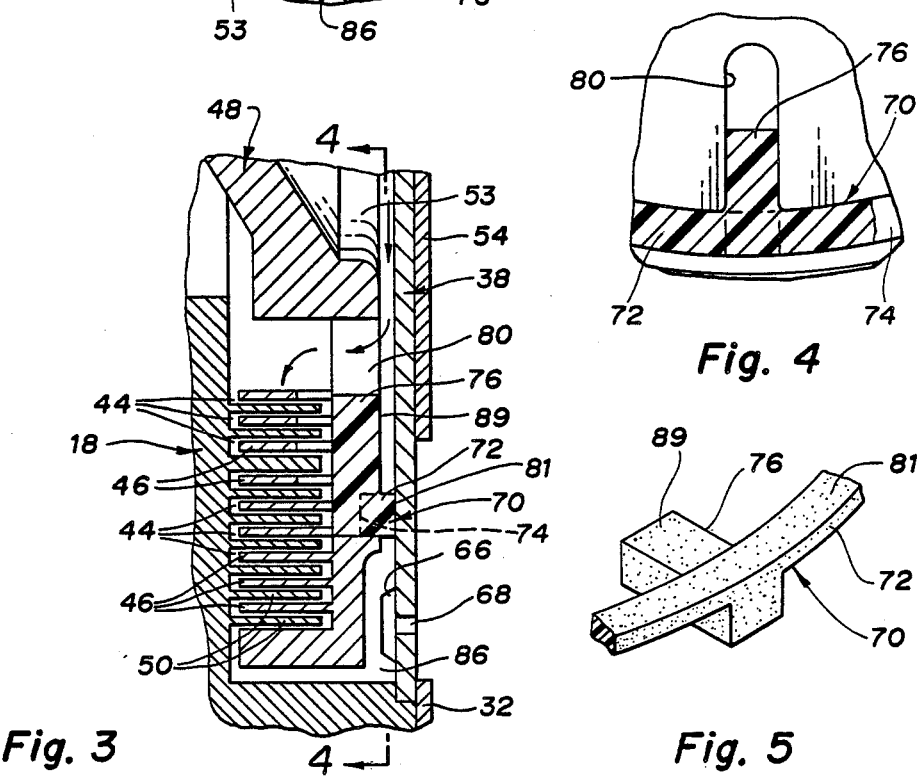
FIG. 3 is an enlarged view of a portion of FIG. 1 to illustrate an axial flow feed slot in the clutch plate and the cooperating blocker ring.
FIG. 4 is a fragmental view of the clutch plate as viewed along lines 4—4 of FIG. 3.
FIG. 5 is a pictorial view of a portion of a fluid blocking and flow control ring of this invention.

The divider and flow control ring has a circular main body 72 operatively mounted in an annular grove 74 formed in the outer face of the clutch plate and further has a plurality of flow blocker arms 76 that are arcuately spaced from one another and extend radially inward from points of integral connection with the inner surface of the main body of the ring. The blocker arms seat in certain of the arcuately spaced fluid fill passages 80 formed in the clutch plate that provide for the feed of viscous fluid into the shear zone. The main body 72 of the ring has a square cross section with an outer annular surface 81 slidably and sealingly engaging the inner surface of the pump plate 38 to form a ring-like outer pumping cavity 86 separate from the intermediate chamber 53 for pumping return fluid to the reservoir and to block the full radial passage of fluid from the reservoir past the forward face of the pump plate directly into the pumping cavity 86. Accordingly, the viscous clutching fluid flows directly from gateway 40 in the pump plate 38 and then radially outwardly into chamber 53 and subsequently through arcuately spaced axial passages 80 formed in the clutch plate. These flow passages are located immediately radially inward of the ring 70 and lead to the serpentined viscous shear zone 44. The flow is shown by flow arrows in FIG. 3 so that fluid from the reservoir is rapidly fed into the intermediate chamber and shear zone without bypass. In the absence of the dynamic fluid seal and blocker ring 72 much of the viscous fluid leaving the reservoir through gateway 40 would flow directly outward between the forward face of the clutch plate 48 and the adjacent face of the pump plate into the pumping cavity 86 and to discharge port 68 thereby bypassing the fluid shear zone 44. This would reduce efficiency and effectiveness of the viscous clutch.

Figure 2:
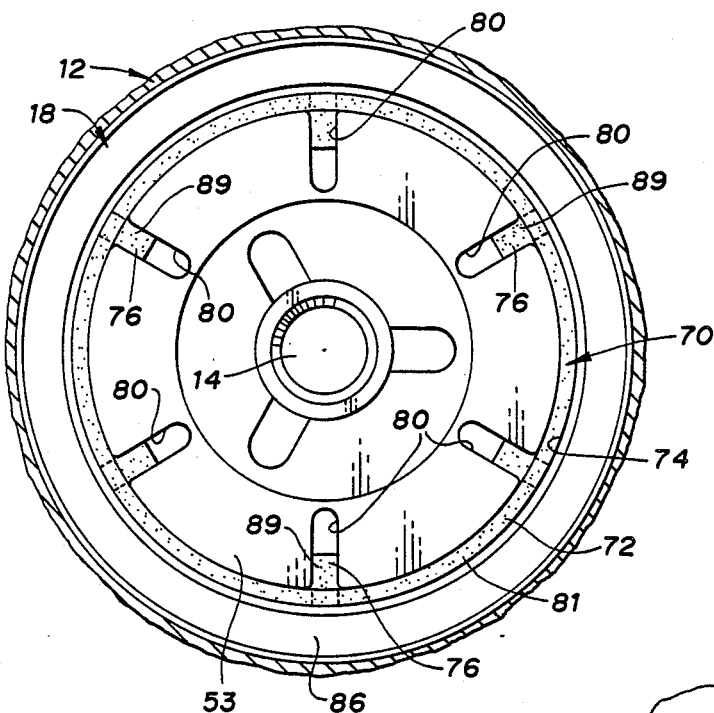
FIG. 2 is a front elevational view taken along lines 2—2 of FIG. 1 but illustrating a modification of the flow control ring of this invention.

The blocker arms 76 of ring 70 can be increased or reduced in length to provide tailoring of the size of the associated opening 80 to control the rate of flow into the shear zone and thereby tailor the response time of the clutch. For example, in FIG. 2 each passage 80 is fifty percent blocked to increase the fill time or as partly shown in FIG. 1 the arms could be extended in length to substantially close only three of the six passages 80 to decrease the flow into the shear zone to increase the time to fill the shear zone to suit particular requirements. The ring can be readily provided with other blocker arm arrangements to provide a flow rate different from that provided with the blocker arm arrangement of the drawing to meet other requirements as to fill time. Accordingly with this invention the same basic clutch construction can be employed on a wide range of vehicles requiring differing response times merely by installing an appropriate blocker ring and blocker arm. It will be appreciated by viewing FIGS. 3 and 5 that the offset blocker arms do not offer any additional frictional drag to the system since outer surface 89 of these arms are spaced from the inner surface of the pump plate. Furthermore the blocker arms fill the entire depth of the associated passage 80 to reduce flow entering the shear zone by flowing behind the main body of the ring. The arms further lock the ring 70 in place to assure that the ring does not pop out of groove 74 during assembly of the pump plate 38 and cover plate 30 to the clutch body 18. The ring 70 thus fixed to the clutch plate provides a wear resistant contact surface 81 sliding against the relatively rotatable pump plate.

With this controlled rate of flow into the shear zone the desired response time is obtained. As the fluid courses through the interleaved lands to pumping cavity 86, the fluid is sheared for the viscous drive of the body 18 and the fan attached thereto. With the speed differential existing between the pump and clutch plates, there is high efficiency and high volume pumping back to the reservoir.

While a preferred embodiment of this invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A bladed fan and hydraulic clutch assembly for inducing a flow of cooling air through a radiator in which engine coolant is circulated comprising an input shaft member adapted to be rotatably driven, clutch plate means rotatably driven by said shaft member, said clutch plate means having a plurality of axially extending and concentric lands, rotatable clutch body means axially spaced from said clutch plate means having a plurality of axially extending and concentric lands interleaved with said lands of said clutch plate means to form a fluid shear zone therebetween, a pump plate fixed to said clutch body means and encasing said clutch plate in said clutch body means, reservoir means for containing a quantity of viscous shear fluid for operating said clutch assembly, an outlet opening for said reservoir, control means for opening and closing said outlet opening, axially extending openings formed in the face of said clutch plate and extending to the concentric lands thereof, annular fluid seal ring means adjacent to said clutch plate openings and operatively interposed between said pump plate and said clutch plate to slidably contact said pump plate and block the flow of fluid outwardly therefrom and blocker arm means extending inwardly from said fluid seal ring means and directly into said axially extending openings for partially blocking a portion of said openings to restrict the flow of fluid therethrough to thereby control the engagement of said clutch, fan blade means extending from said clutch body means, said pump plate having pumping means associated therewith to pump fluid exiting from said shear zone back to said reservoir.

2. The assembly defined in claim 1 wherein said blocker arm means has an outer face offset from said seal ring means and spaced from said pump plate to minimize frictional drag between said ring and said pump plate.

3. A bladed fan and hydraulic clutch assembly for inducing a flow of cooling air through a radiator in which engine coolant is circulated comprising an input shaft member adapted to be rotatably driven, clutch plate means rotatably driven by said shaft member, said clutch plate means having a plurality of axially extending and concentric lands, axial viscous fluid flow opening means through at least a portion of said clutch plate means communicating with said lands, clutch body means axially spaced from said clutch plate means having a plurality of axially extending and concentric lands interleaved with the lands of said clutch plate means to form a fluid shear zone therebetween, a pump plate secured to said clutch body means and encapsulating said clutch plate means, a cover plate fixed to said clutch body means, a reservoir for viscous shear fluid for said clutch assembly, a fluid for said clutch assembly, a fluid supply passage in said pump plate, control means for opening and closing said supply passage, annular seal ring means interposed between said pump plate and said clutch plate and adjacent to said axial flow opening means for diverting said clutch fluid into said shear zone through said axial flow openings means so that said clutch body means can be rotatably driven by said clutch plate means through the shear of fluid therein, fan blade means extending from said clutch body means, and pumping means outboard of said seal ring means for pumping clutch fluid from the shear zone into said reservoir and blocker arm means extending radially inward from said seal ring means for filling a portion of said axial flow opening means to restrict the effective size of the opening and thereby control the rate of fluid flow to said shear zone.

4. The assembly of claim 3 wherein said blocker arm means is offset from the plane of said ring to fill a portion of said axial flow openings and to provide clearance from said pump plate to reduce frictional drag between said ring and said pump plate.

* * * * *